United States Patent [19]

Riedel

[11] 3,829,204
[45] Aug. 13, 1974

[54] SWITCH ACTUATING ARRANGEMENT FOR USE IN MOTION PICTURE PROJECTORS OR THE LIKE

[75] Inventor: Wolfgang Riedel, Winnenden, Germany

[73] Assignee: Robert Bosch Photokino GmbH, Stuttgart, Germany

[22] Filed: July 11, 1973

[21] Appl. No.: 378,373

[30] Foreign Application Priority Data
July 14, 1972 Germany............................ 2234602

[52] U.S. Cl. ............................................. 352/124
[51] Int. Cl. ............................................. G03b 1/04
[58] Field of Search..................... 352/92, 124, 173; 179/100.2 Z; 226/44, 11; 242/189; 200/61.18, 153 LA

[56] References Cited
UNITED STATES PATENTS

| | | | |
|---|---|---|---|
| 2,159,076 | 5/1939 | Douglas........................ | 200/153 LA |
| 2,345,656 | 4/1944 | Calleson et al. ...................... | 226/44 |
| 3,700,187 | 10/1972 | Thomson ........................... | 352/124 |
| 2,910,564 | 10/1959 | McBroom..................... | 200/153 LA |
| 3,700,186 | 10/1972 | Burnham ........................... | 352/124 |

*Primary Examiner*—Samuel S. Matthews
*Assistant Examiner*—Russell E. Adams, Jr.
*Attorney, Agent, or Firm*—Michael S. Striker

[57] ABSTRACT

A motion picture projector wherein the film is transported from a supply reel to a takeup reel and forms a loop upstream of the gate. The concave side of the loop is adjacent to an elastic damping member which is displaced by the loop when the pull-down continues to advance the film toward the takeup reel after the supply of film on the supply reel is exhausted but the trailing end of the film remains attached to the core of the supply reel so that the tension of the film increases. The damping member then causes a trip to actuate a microswitch which arrests or reverses the motor for the pull-down. The trip actuates the microswitch when the tension of the film increases to a first value and thereupon maintains the microswitch in actuated condition as the tension of film increases, for example, due to inertia of moving parts of the film transporting mechanism. The resistance which the trip offers to movement with the damping member when the tension of film increases subsequent to actuation of the microswitch remains unchanged. The trip is reset to its starting position in automatic response to manipulation of a master switch which can reverse the motor for the pull-down.

20 Claims, 6 Drawing Figures

SWITCH ACTUATING ARRANGEMENT FOR USE IN MOTION PICTURE PROJECTORS OR THE LIKE

BACKGROUND OF THE INVENTION

The present invention relates to improvements in apparatus wherein an elongated web of finite length is transported lengthwise in a manner known from the art of cinemotographic apparatus, tape recorders or the like. More particularly, the invention relates to improvements in switch actuating arrangements in such apparatus. Since a motion picture projector constitutes a typical example of web transporting apparatus which can embody the switch actuating arrangement of the present invention, the invention will be described with reference to a motion picture projector with the understanding, however, that the invention can be embodied with equal advantage in tape recorders or any other apparatus wherein a finite length of a web of magnetic tape, photographic film or the like is transported lengthwise and the web is utilized to automatically actuate a switch when its tension changes.

It is already known to control the motor of the film transporting mechanism in a motion picture projector by means of a switch which is actuated when the tension of motion picture film increases as a result of nearly complete withdrawal of film from the supply reel. It is further known to utilize in such motion picture projectors an elastic damping member which is adjacent to a portion of the film path and serves to actuate the switch as the tension of film rises to a predetermined value. The actuated switch can open the circuit of an electric motor of the film transporting mechanism or serves to reverse the direction of operation of the motor so that the motor begins to actuate the customary pull-down in a direction to transport the film from the takeup reel back toward the supply reel.

The just described mode of actuating the switch by means of an elastic damping member exhibits a number of serious drawbacks. Thus, when the tension of motion picture film begins to rise but the pull-down continues to advance the film stepwise in the region of the gate, the damping member is deformed by the film and eventually undergoes a deformation which suffices to initiate the actuation (e.g., opening) of the switch. From there on, the pressure which the damping member applies to a movable portion of the switch rises and falls in rhythm with movements of the pull-down. Such fluctuations of pressure are terminated when a spring of the switch reaches and snaps over its dead-center position to actually open the switch and to thereby arrest or reverse the motor of the film transporting mechanism. The aforementioned fluctuations of pressure which the damping member applies to the switch result in rapid destruction of the switch, especially if the latter is a highly sensitive microswitch. Moreover, if the motion picture projector is provided with means for reproducing the sound simultaneously with reproduction of images of moving objects or the like, the amplifier of the sound reproducing unit invariably produces unpleasant noises which are directly attributable to oscillatory movements of the damping member while the tension of the motion picture film rises. Moreover, the movable portion of the switch offers to deformation of the damping member a gradually increasing resistance so that the resistance which the damping member offers to deformation increases and the film is subjected to excessive wear as a result of further movement (under the action of the pull-down) relative to the damping member which cannot yield or yields only in response to a substantial rise in film tension.

As a rule, the moving parts of the film transporting mechanism continue to move due to inertia after the motor is arrested in automatic response to actuation of the switch. Consequently, the strongly deformed damping member undergoes additional deformation and tends to expand and to move the film rearwardly as soon as the claw of the pull-down is disengaged from the adjacent perforation. The force which the damping member exerts against the film is quite substantial, either because the stiffness of the damping member increases with progressing deformation or because the damping member is incapable of yielding as soon as the movable portion of the switch reaches its fully depressed position. As mentioned before, the thus stressed damping member tends to move the film rearwardly as soon as the claw of the pull-down is disengaged from the film whereby the film is likely to leave its path, for example, in the region of the gate, or to move its perforations out of register with the claw of the pull-down whereby the claw is likely to damage the film during movement toward and into the nearest perforation.

It was further observed that the oscillating damping member causes the switch to open and close at frequent intervals while the tension of motion picture film increases during the last stage of withdrawal from the supply reel. Such repeated opening and closing of the switch results in excessive wear upon its parts and often causes excessive voltage peaks which are likely to cause the fuse or fuses of the motion picture projector to disconnect the currentconsuming parts from the energy source.

If the motion picture film is convoluted on the core of a supply reel which is stored in a cassette, the tension of film is likely to fluctuate during normal transport toward the takeup reel whereby the damping member undergoes a deformation which suffices to partially depress the movable element of the switch. For example, the supply reel may be mounted in the cassette in such a way that its resistance to rotation is greater in one angular position but smaller or normal in each other angular position. The resulting changes in film tension bring about the just mentioned depression of the movable switch element which can generate considerable noise and is even likely to affect the reproduction of sound as well as to cause a change in the rotational speed of the motor.

SUMMARY OF THE INVENTION

An object of the invention is to provide a novel and improved switch actuating arrangement which can be used in motion picture projectors or analogous apparatus wherein a finite length of motion picture film, magnetic tape or analogous web material is transported lengthwise from a supply reel or other storing means.

Another object of the invention is to provide a switch actuating arrangement which is just as simple as but more reliable, longer-lasting and quieter than heretofore known switch actuating arrangements.

A further object of the invention is to provide novel and improved means for actuating a switch in response to changes of web tension in a motion picture projector or the like.

Still another object of the invention is to provide a novel and improved operative connection between a switch and the damping device which is employed in many motion picture projectors or analogous apparatus to compensate for the fact that the supply reel rotates constantly while the pull-down or an analogous web transporting member advances the web in stepwise fashion.

A further object of the invention is to provide a motion picture projector wherein the operation of the motor which forms part of the film transportingmeans can be controlled with a minimal number of electric switches.

Another object of the invention is to provide a novel and improved damping device for use in motion picture projectors or the like.

The invention is embodied in an apparatus which is used for transport of elongated flexible webs, particularly to a cinematographic apparatus (especially motion picture projector) or a tape recorder. The apparatus comprises a supply reel or analogous storing means which is arranged to store a supply of elongated web (such as photographic film or magnetic tape) of finite length having a trailing end connected to the storing means (e.g., to the core of the aforementioned supply reel), guide means defining for the web an elongated path (which may extend from the supply reel, through the gate and to the core of the takeup reel in a motion picture projector), transporting means which is operable at least in a direction to advance the web lengthwise from the storing means along the aforementioned path and to progressively change (for example, increase) the tension of the web after the supply of web in the storing means is depleted to a predetermined extent (e.g., when the trailing end of the web extends substantially radially from the core of a supply reel), a scanning device (such as an elastic damping member) which is adjacent to the path and is movable by the web from a normal or operative position to a first displaced position and from such first displaced position to a plurality of second displaced positions as the aforementioned change of tension respectively reaches a lower value and a plurality of higher values, an electric switch (preferably a microswitch) which is actuatable to terminate the operation of the transporting means in the aforementioned direction (the actuated switch can arrest the motor of the transporting means or reverses the direction of operation of the transporting means so that the web is transported back toward the storing means), and novel actuating means for the switch. In accordance with a feature of the invention, the actuating means is movable by the scanning device from a starting position (corresponding to the normal position of the scanning device) to a first additional position in which the switch is actuated and the scanning device assumes its first displaced position, and beyond the first additional position to a plurality of second additional positions in each of which the switch remains actuated and in each of which the scanning device assumes a different second displaced position. The actuating means offers a substantially constant resistance to movement beyond the first additional position to any of its second additional positions.

The actuating means may be rigid with the scanning device or it may be mounted in the path of movement of the scanning device from its normal position. In the latter instance, the apparatus preferably further comprises resetting means which is operable, e.g., by a master switch for the motor of the film transporting means or by the motor of the film transporting means, to return the actuating device to its starting position, for example, in response to the start of operation of the transporting means in a direction to advance the film back toward the storing means. The scanning device is preferably arranged to automatically reassume its normal position when permitted by the film in the path between the storing means and the takeup reel.

The novel features which are considered as characteristic of the invention are set forth in particular in the appended claims. The improved switch actuating arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
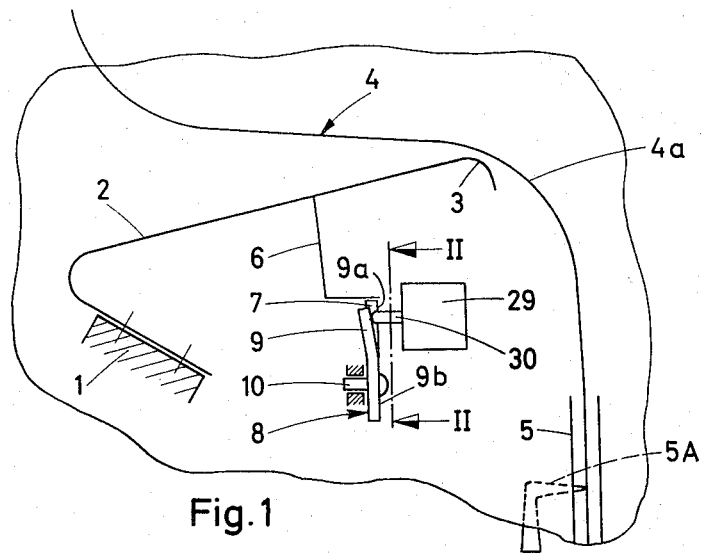
FIG. 1 is a fragmentary vertical sectional view of a motion picture projector including a switch actuating arrangement which embodies one form of the invention.
Figure 2:
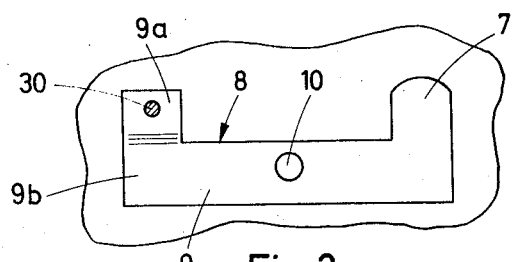
FIG. 2 is a sectional view as seen in the direction of arrows from the line II—II of FIG. 1.
Figure 3:
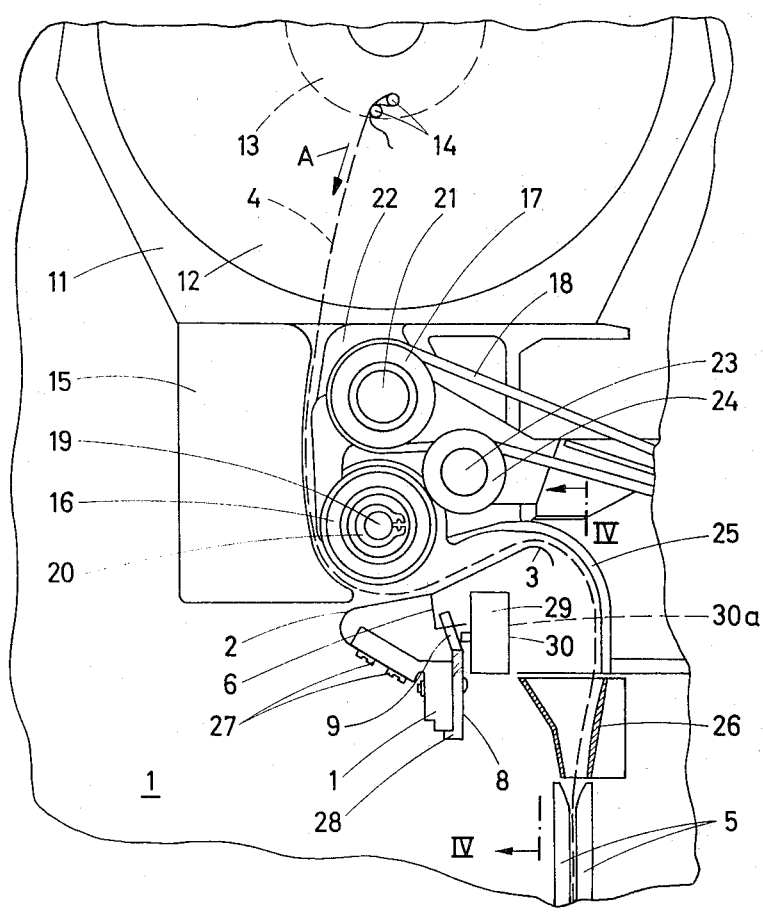
FIG. 3 is a smaller-scale view of the structure shown in FIG. 1 and of certain other parts of the motion picture projector.

Referring to FIGS. 1 to 4, and first to FIGS. 1 and 2, there is shown a portion of a motion picture projector which comprises a housing 1 supporting a combined elastic damping and scanning member 2 having a curved end portion 3 which engages one side of a strip or web of motion picture film 4. As shown in FIG. 3, the film 4 is confined in a storing means in the form of a cassette 11 and is being fed in the direction indicated by arrow A so that successive film frames move into register with the projection lamp 41 (FIG. 4) while being located in a gate 5. The end portion 3 of the damping member 2 engages the concave side of a loop 4a of the film 4 immediately upstream of the gate 5. The claw of a pull-down which intermittently transports the film 4 in the region of the gate 5 so as to place successive frames into register with the lamp 41 is shown at 5A. One of the functions of the damping member 2 is to compensate for the fact that the claw 5A advances the film 4 intermittently whereas the supply reel 12 in the cassette 11 rotates substantially continuously.

Another function of the damping member 2 is to indirectly effect the actuation of a microswitch 29 which serves to arrest or to reverse the direction of rotation of the camera motor 42 (see FIG. 4) when the tension of film 4 increases to an extent which is indicative that the film has been nearly completely withdrawn from the cassette 11, i.e., that the supply of film on the core 13 of the reel 12 has been depleted to a predetermined extent. To this end, the damping member 2 comprises a motion transmitting portion 6 which can move an actuating member or trip 8 in the form of a lever turnably mounted on a pivot member 10 in the housing 1. The right-hand arm of the actuating lever 8, as viewed in FIG. 2, has a rounded projection 7 which is adjacent to the path of movement of the motion transmitting portion 6 and by means of which the lever 8 is pivoted clockwise, as viewed in FIG. 2, or anticlockwise, as viewed in FIG. 4, when the size of the loop 4a decreases in response to substantially complete withdrawal of film 4 from the supply reel 12. The other arm 9 of the lever 8 is provided with a suitably inclined cam surface 9a which can depress a reciprocable element or follower 30 of the microswitch 29 in response to a predetermined angular displacement of the lever 8 under the action of the motion transmitting portion 6. The pivot member 10 allows the lever 8 to pivot clockwise or counterclockwise and holds the lever against movement axially thereof.

Figure 4:
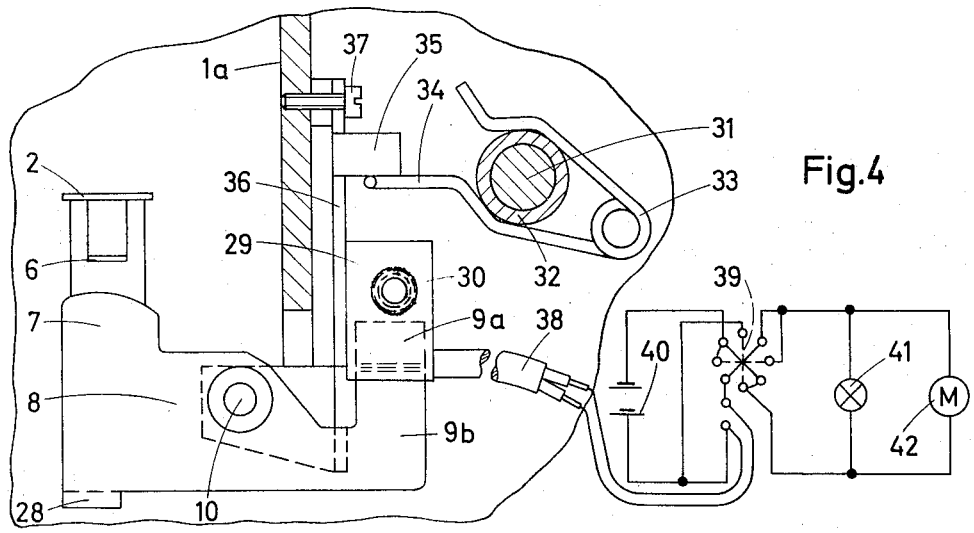
FIG. 4 is a view substantially as seen in the direction of arrows from the line IV—IV of FIG. 3.

Referring now in detail to FIGS. 3 and 4, the storing means or cassette 11 for film 4 is shown as being installed in the housing 1 and the core 13 of its supply reel 12 has two pins 14 or analogous coupling or attaching means for the trailing portion of the film 4. An opening in the lower end wall of the cassette 11 is adjacent to a stationary guide member 15 which is mounted in or forms part of the housing 1 and guides the film upstream of the damping member 2. The right-hand side of that portion of the film path which extends along the stationary guide member 15 is defined by a roller 16 and a sheave 17 which latter is located at a level above the roller 16. An endless flexible element 18 is trained over the sheave 17 and serves as a component part of the means for threading the leader of film 4 through the projector upon insertion of the cassette 11 into the housing. The flexible element 18 is further trained over another sheave (not shown) and is tensioned by a roll 24 which is rotatably mounted on a horizontal shaft 23. The roller 16 is mounted on a horizontal shaft 19 which is installed in the housing 1 and carries a split ring 20 which holds the roller 16 against excessive axial movement. The shaft 21 for the sheave 17 is mounted on a pivotable carrier 22 which further supports the shaft 23 for the tensioning roll 24. The carrier 22 can move the sheave 17 upwardly, as viewed in FIG. 3, so as to engage the flexible element 18 with the outermost convolution of the supply of film 4 in the cassette 11 preparatory to threading of the leader of film 4 through the projector. The carrier 22 includes a portion 25 having a concave surface which guides the film 4 in the region of the loop 4a, i.e., opposite the curved end portion 3 of the damping member 2. A funnel-shaped auxiliary guide member 26 is mounted in the housing 1 downstream of the portion 25 to introduce the leader of film 4 into the gate 5 and into the range of the claw 5A.

That end portion of the elastic damping member 2 which is remote from the curved end portion 3 is secured to the housing 1 by screws 27 or analogous fasteners. The actuating lever 8 is further provided with a projection or lug 28 which abuts against an adjacent stop surface of the housing 1 when the lever assumes its starting position, i.e., when the microswitch 29 is open. The latter is mounted in the housing 1 between the portion 25 of the carrier 22 and the damping member 2. The movable element 30 of the microswitch 29 may constitute a movable contact which tends to assume an extended position (shown in FIG. 1) or a part which can move a movable contact into current-conducting engagement with a fixed contact in the interior of the microswitch 29. The element 30 is reciprocable along a straight path which is normal to a second surface 9b of the arm 9.

As shown in FIG. 4, the housing 1 further supports a resetting device for the actuating lever 8. This resetting device includes a rotary shaft 31 which is closely or immediately adjacent to the arm 9 of the actuating lever 8 and is surrounded by a sleeve 32 consisting of a material having a high coefficient of friction. The sleeve 32 is mounted for rotation with the shaft 31 and is in frictional engagement with the two legs or prongs of a substantially U-shaped elastic motion transmitting member or clip 33 which resembles a torsion spring and one leg 34 of which normally abuts against a fixed stop 35 in the housing 1. The shaft 31 rotates in one direction during forward transport of the film 4 and in the opposite direction when claw 5A transports the film 4 rearwardly, i.e., back into the cassette 11. The arrangement is such that the clip 33 rotates with the shaft 31 and sleeve 32 when the film 4 begins to move forwardly whereby the leg 34 moves into abutment with the stop 35. From there on, the shaft 31 and the sleeve 32 rotate relative to the clip 33. When the film 4 is transported rearwardly, the shaft 31 causes the sleeve 32 to turn the clip 33 counterclockwise, as viewed in FIG. 4, whereby the leg 34 moves away from the stop 35 and engages the arm 9 of the actuating lever 2 to thereby return the lever 8 to the starting position of FIG. 1 or 4. The microswitch 29 is mounted on a bracket 36 which is secured to a wall 1a of the housing 1 by several screws or analogous fasteners 37 (one shown in FIG. 4). The bracket 36 preferably further carries the pivot member 10 for the actuating lever 8 and the stop 35 for the leg 34 of the elastic clip 33. The stop 35 may form an integral part of the bracket 36.

The conductor means 38 which is connected with the microswitch 29 forms part of the primary circuit of the motion picture projector. The primary circuit further comprises a selector switch or master switch 39, an energy source 40, the aforementioned projection lamp 41 and the aforementioned reversible electric motor 42 which drives the pull-down (claw 5A) and the takeup reel (not shown). The microswitch 29 can open the primary circuit while the film 4 is transported forwardly (so that it is collected by the core of the takeup reel) as soon as the tension of film in the region of the carrier portion 25 and damping member 2 increases, i.e., as soon as the size of the loop 4a is reduced as a result of nearly complete withdrawal of film from the cassette 11. The microswitch 29 cannot influence the primary circuit of the motion picture projector when the selector switch 39 assumes the broken-line position of FIG. 4, i.e., when the motor 42 is operated in reverse.

The operation:

When the master switch 39 assumes the solid-line position of FIG. 4, the motor 42 drives the pull-down in such a way that the claw 5A advances the film 4 forwardly in stepwise fashion. The motor 42 also drives the core of the takeup reel so that the latter collects the film 4 downstream of the gate 5. Successive increments of the film 4 which are being withdrawn from the cassette 11 for the supply reel 12 travel in the path portion between the stationary guide member 15 on the one hand and the roller 16 and sheave 17 on the other hand, thereupon along the concave surface of the carrier portion 25 (i.e., around the curved end portion 3 of the damping member 2), through the funnel-shaped auxiliary guide member 26 and into the gate 5. The damping member 2 then acts solely as a means to compensate for the fact that the claw 5A advances the film 4 stepwise while the supply reel 12 in the cassette 11 rotates uninterruptedly.

When the supply of film 4 in the cassette 11 is practically exhausted, i.e., when the trailing portion of the film 4 extends substantially radially of the core 13 as shown in FIG. 3 by broken lines, the claw 5A reduces the size of the loop 4a so that the damping member 2 is displaced and moves its curved end portion 3 toward the funnel-shaped guide member 26. This causes the motion transmitting portion 6 of the damping member 2 to engage the projection 7 of the actuating lever 8 and to pivot the latter counterclockwise, as viewed in FIG. 4, so that the inclined cam surface 9a of the arm 9 moves toward and engages the element 30 of the microswitch 29. The inclination of the cam surface 9a is such that the depression of the element 30 progresses proportionally with decreasing size of the loop 4a and that the microswitch 29 becomes actuated and opens the primary circuit of the motion picture projector when the size of the loop 4a is reduced to a predetermined value. This is a first additional position of the actuating lever 8 and corresponds to a first displaced position of the member 2.

The motor 42 is arrested in response to actuation of the microswitch 29; however, the moving parts of the projector (including the pull-down and its claw 5A) continue to move for a while owing to inertia so that the claw 5A further reduces the size of the loop 4a. This cannot result in any damage to the damping member 2 and/or microswitch 29 because the actuating lever 8 is free to continue its counterclockwise pivotal movement (as viewed in FIG. 4) under the action of the motion transmitting portion 6 while its arm 9 continues to maintain the microswitch 29 in open position. As best shown in FIG. 1, the inclined cam surface 9a of the arm 9 gradually depresses the element 30 of the microswitch 29 during the initial stage of pivotal movement of the lever 8 from its starting position (i.e., during movement of the lever from the starting position to the first additional position). The second surface 9b (which is normal to the axis and direction of reciprocatory movement of the element 30) does not change the axial position of the element 30 once the microswitch 29 opens. The inclined cam surface 9a can open the microswitch 29 shortly or immediately after the claw 5A begins to reduce the size of the loop 4a, or shortly before the element 30 is engaged by the second surface 9b. The actuating lever 8 has sufficient room to pivot to a number of second additional positions (i.e., beyond the first additional position) while the element 30 is engaged by the second surface 9b (i.e., while the microswitch 29 is open) to thus insure that the damping member 2, the lever 8 and/or the microswitch 29 cannot be damaged if the inertia of moving parts causes a relatively long-lasting operation of the pull-down after the primary circuit of the projector has been opened by the switch 29. Each second additional position of the lever 8 corresponds to a different second displaced position of the damping member 2.

As long as the motor 42 operates in the normal way (so that the film 4 is transported from the supply reel 12 in the cassette 11 to the takeup reel), the shaft 31 rotates the sleeve 32 clockwise, as viewed in FIG. 4, so that the leg 34 of the clip 33 bears against the stop 35. This insures that the leg 34 cannot interfere with movement of the actuating lever 8 from its starting position in response to a reduction in the size of the loop 4a. If the operator decides to rewind the film 4 onto the core 13 of the supply reel 12 or to return a length of film 4 into the cassette 11 prior to the making of exposures with fade-in effect, the selector switch 39 is moved to the broken-line position of FIG. 4 whereby the circuit of the motor 42 is completed in reverse irrespective of the condition of the microswitch 29. The motor 42 then rotates the shaft 31 and sleeve 32 of the resetting means in a counterclockwise direction, as viewed in FIG. 4, so that the leg 34 of the elastic clip 33 engages the arm 9 and returns the actuating shaft 8 to its starting position. Consequently, the element 30 of the microswitch 29 is free to reassume the extended position of FIG. 1, the microswitch 39 closes, and the projector is ready for renewed presentation of the film 4 or for the presentation of a fresh film. The friction between the sleeve 32 (which constitutes a simple friction clutch) and the legs of the clip 33 suffices to move the actuating lever 8 back to the starting position of FIG. 4 irrespective of the fact that the clip 33 must overcome the friction between the element 30 and the surfaces 9b, 9a of the arm 9. The clip 33 is arrested (i.e., it ceases to turn counter-clockwise with the shaft 31 and sleeve 32) as soon as the lug 28 of the actuating lever 8 reaches the stop shoulder of the housing 1. This is the starting position of the actuating lever.

The parts 31–33 constitute but one form of resetting means which can be used in the motion picture projector of FIGS. 1 to 4 to return the actuating lever 8 to its starting position. For example, the selector switch 39 may be coupled with a suitable linkage or gear train (not shown) which automatically resets the lever 8 to the starting position of FIG. 4 as soon as the selector switch 39 is moved to the broken-line position. All that counts is to insure that the actuating lever 8 is returned to its starting position not later than when the selector switch 39 is again returned to its solid-line position in order to start the transport of film in a direction from the supply reel to the takeup reel.

The element 30 of the microswitch is either elastic or is biased to its extended position by a suitable spring 30a (shown in FIG. 3) so that it can engage the surface 9a or 9b of the arm 9 with a certain amount of friction. This is desirable in order to provide a self-locking action which insures that the angular position of the actuating lever 8 cannot be changed accidentally, i.e., the lever 8 can change its position only in response to movement of the damping member 2 from the normal position to the first displaced position (when the microswitch 29 opens) or to one of the several second displaced positions (in each of which the element 30 is engaged by the surface 9b and the microswitch 29 remains open), or in response to operation of the resetting means 31–33.

It will be noted that, when the shaft 31 rotates in a clockwise direction, as viewed in FIG. 4, and the leg 34 of the elastic clip 33 bears against the stop 35, the clip 33 exhibits a tendency to open and to reduce friction between its legs and the friction clutch 32. This results in a reduction of the wear upon the ports 32, 33.

If the switch 39 is considered as forming part of the resetting means for the actuating lever 8, this resetting means can perform several functions, namely, returning the actuating lever to its starting position and reversing the direction of operation of the pull-down including the claw 5A.

The lamp 41 constitutes but one of several current-consuming devices whose condition can be changed in response to actuation of the microswitch 29.

Figures 5, 6:
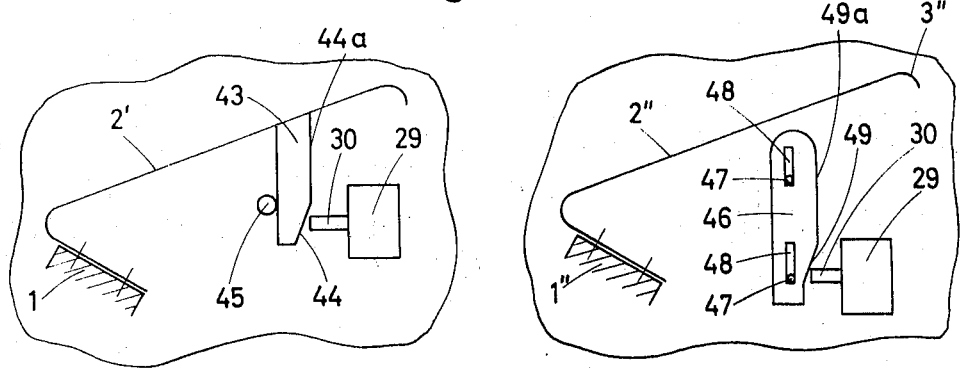
FIG. 5 is a fragmentary vertical sectional view of a projector including a modified switch actuating arrangement.
FIG. 6 is a similar view but showing a third switch actuating arrangement.

FIG. 5 illustrates a portion of a modified motion picture projector wherein the combined damping and scanning member 2' is provided with an integral or separable actuating member or trip 43 replacing the lever 8 of FIGS. 1 to 4. The actuating member 43 has an inclined cam surface 44 corresponding to the cam surface 9a of the arm 9 and a second surface 44a corresponding to the surface 9b. During flexing of the damping member 2' by the film (not shown), or owing to its own elasticity, the rear side of the actuating member 43 slides along a stationary pin-shaped back support 45. The microswitch 29 opens not later than when the upper end of the cam surface 44 engages the element 30 and remains open while the element 30 is engaged by the second surface 44a. The construction of the projector which embodies the structure of FIG. 5 is preferably identical with or analogous to that of the projector shown in FIGS. 3 and 4.

FIG. 6 illustrates a switch actuating arrangement which embodies certain features of the arrangement of FIGS. 1–4 as well as certain features of the arrangement of FIG. 5. The actuating member 43 of FIG. 5 is replaced with a slide-like reciprocable actuating member 46 having elongated slots 48 for guide pins 47 which are mounted in the housing 1". The right-hand side of the actuating member 46 is provided with an inclined cam surface 49 corresponding to the cam surface 44 or 9a and with a second surface 49a corresponding to the surface 44a of 9b. When the combined damping and scanning member 2" is flexed by the film (not shown), the actuating member 46 is caused to leave the starting position of FIG. 6 and its cam surface 49 slides along and depresses the element 30 of the microswitch 29. The microswitch 29 opens not later than when the element 30 is engaged by the second surface 49a.

The operation of the structure shown in FIG. 6 is clearly analogous to that of the structure shown in FIGS. 1–2 or FIG. 5. The actuating member 46 opens the switch 29 when the size of the loop formed by the film in the region of the end portion 3" of the damping member 2" is reduced. The manner in which the actuating member 46 of FIG. 6 is returned to the illustrated starting position is preferably the same as or analogous to that described in connection with FIGS. 1–4. The actuating member 43 of FIG. 5 moves with the damping member 2' at all times, i.e., the resetting means can be omitted if the actuating member is directly coupled with the damping member. Such resetting means is necessary only if the damping member can move toward its normal position independently of the actuating member (see FIGS. 1–4 and 6).

The guide pins 47 of FIG. 6 preferably engage the actuating member 46 with sufficient friction to insure that the member 46 can change its position only by the damping member 2" or by the resetting mechanism. This preferably also applies for the pivot member 10 of the structure shown in FIGS. 1–4.

Without further analysis, the foregoing will so fully reveal the gist of the present invention that others can, by applying current knowledge, readily adapt it for various applications without omitting features which fairly constitute essential characteristics of the generic or specific aspects of my contribution to the art and, therefore, such adaptations should and are intended to be comprehended within the meaning and range of equivalence of the claims.

What is claimed as new and desired to be protected by Letters Patent is:

1. In an apparatus for transporting elongated flexible webs, particularly in a motion picture projector, a combination comprising storing means arranged to store a supply of elongated web of finite length having a trailing end connected to said storing means; guide means defining for the web an elongated path; transporting means operable at least in a direction to advance the web lengthwise from said storing means along said path and to progressively change the tension of the web after the supply of web in said storing means is depleted to a predetermined extent; a scanning device adjacent to said path and being movable by the web from a normal position to a first displaced position and from said first displaced position to a plurality of second displaced positions as said change of tension respectively reaches a lower value and a plurality of higher values; an electric switch actuatable to terminate the operation of said transporting means in said direction; and actuating means for said switch, said actuating means being movable by said scanning device from a starting position to a first additional position in which said actuating means actuates said switch and said scanning device assumes said first displaced position, and beyond said first additional position to a plurality of second additional positions in each of which said actuating means continues to actuate said switch and in each of which said scanning device assumes a different one of said second displaced positions, said actuating means being arranged to offer to said scanning device a substantially constant resistance to movement of said actuating means beyond said first additional position to any of said second additional positions.

2. A combination as defined in claim 1, wherein at least a portion of said scanning device consists of elastomeric material and said scanning device tends to assume and remain in said normal position thereof.

3. A combination as defined in claim 1, further comprising resetting means operable to return said actuating means to said starting position.

4. A combination as defined in claim 3, further comprising selector means actuatable to change the direction of operation of said transporting means and to thereby operate said resetting means.

5. A combination as defined in claim 1, wherein at least a portion of said scanning device consists of elastomeric material and said scanning device is movable with respect to said actuating means from said displaced positions to said normal position thereof.

6. A combination as defined in claim 5, further comprising friction generating means arranged to oppose the movement of said actuating means from said starting position thereof so that said actuating means changes its position in a direction away from said starting position only in response to a corresponding change in the position of said scanning device in a direction away from said normal position.

7. A combination as defined in claim 6, further comprising resetting means operable to return said actuating means to said starting position.

8. A combination as defined in claim 7, wherein said resetting means is arranged to change the direction of operation of said transporting means in response to actuation thereof for returning said actuating means to said starting position.

9. A combination as defined in claim 1, wherein said actuating means includes a lever which is pivotable from said starting position to said first additional position and beyond said first additional position to said second additional positions.

10. A combination as defined in claim 9, wherein said lever comprises a first arm which receives motion from said scanning means and a second arm which actuates said switch, said second arm having a cam surface which engages said switch in said first additional position of said actuating means and a second surface inclined with respect to said cam surface and engaging said switch in said second additional positions of said actuating means.

11. A combination as defined in claim 10, further comprising a lamp electrically connected with said switch, said lamp being arranged to assume a first condition prior and a different second condition subsequent to actuation of said switch by said actuating means.

12. A combination as defined in claim 1, further comprising resetting means operable to return said actuating means to said starting position, said switch comprising an element which is frictionally engaged by said actuating means in said additional positions of said actuating means whereby said element exerts upon said actuating means a locking action to hold said actuating means against movement except by way of said scanning device or by way of said resetting means.

13. A combination as defined in claim 12, wherein said actuating means includes a cam surface and said element is a spring-biased follower which engages said cam surface at least in said first additional position of said actuating means.

14. A combination as defined in claim 1, wherein said transporting means is further operable in a second direction counter to said first mentioned direction, and further comprising resetting means for returning said actuating means to said starting position in response to operation of said transporting means in said second direction.

15. A combination as defined in claim 1, wherein said switch comprises an element which is movable by said actuating means along a straight second path between an extended position and a depressed position, said actuating means having a first surface which makes with said second path an oblique angle and engages and depresses said element during movement of said actuating means from said starting position to said first additional position, and a second surface which is normal to said second path and engages said element to maintain the latter in said depressed position in said second additional positions of said actuating means.

16. A combination as defined in claim 1, wherein said guide means includes means for providing the web in said path with a loop having a concave side, said scanning device being adjacent to said concave side of said loop and the length of said loop decreasing in response to operation of said transporting means after the supply of web in said storing means is depleted to said predetermined extend whereby the loop moves said scanning device from said normal position.

17. In an apparatus for transporting elongated flexible webs, particularly in a motion picture projector, a combination comprising storing means arranged to store a supply of elongated web of finite length having a trailing end connected to said storing means; guide means defining for the web an elongated path; transporting means operable in a first direction to advance the web lengthwise from said storing means along said path and to progressively change the tension of the web after the supply of web in said storing means is depleted to a predetermined extent, and in a second direction counter to said first direction; a scanning device adjacent to said path and being movable by the web from a normal position to a first displaced position and from said first displaced position to a plurality of second displaced positions as said change of tension respectively reaches a lower value and a plurality of higher values; an electric switch actuatable to terminate the operation of said transporting means in said first direction; actuating means for said switch, said actuating means being movable by said scanning device from a starting position to a first additional position in which said switch is actuated and said scanning device assumes said first displaced position, and beyond said first additional position to a plurality of second additional positions in each of which said switch remains actuated and in each of which said scanning device assumes a different one of said second displaced position, said actuating means being arranged to offer a substantially constant resistance to movement beyond said first additional position to any of said second additional positions; and resetting means for returning said actuating means to said starting position in response to operation of said transporting means in said second direction, said resetting means comprising a rotary member which is respectively driven in a first and a second direction in response to operation of said transporting means in said first and second directions, a motion transmitting member rotatably mounted on said rotary member, friction clutch means interposed between said rotary member and said motion transmitting member for moving the latter against said actuating means so as to return said actuating means to said starting position in response to rotation of said rotary member in said second direction and for moving said motion transmitting member away from said actuating means in response to rotation of said rotary member in said first direction to thereby allow said actuating means to leave said starting position under the action of said scanning device.

18. A combination as defined in claim 17, further comprising stop means for limiting the extent of movement of said motion transmitting member away from said actuating means.

19. A combination as defined in claim 18, wherein said friction clutch means comprises a sleeve mounted on and rotatable with said rotary member, said motion transmitting member including an elastic clip frictionally engaging said sleeve and having a portion which is respectively movable into engagement with said actuating means and with said stop means in response to rotation of said rotary member in said second and first directions.

20. A combination as defined in claim 19, wherein said portion of said clip is arranged to reduce friction between said sleeve and said clip when said portion engages said stop means and said rotary member continues to rotate in said first direction.

* * * * *